S. C. DIX.
Sulky-Harrow.
No. 209,028.  Patented Oct. 15, 1878.
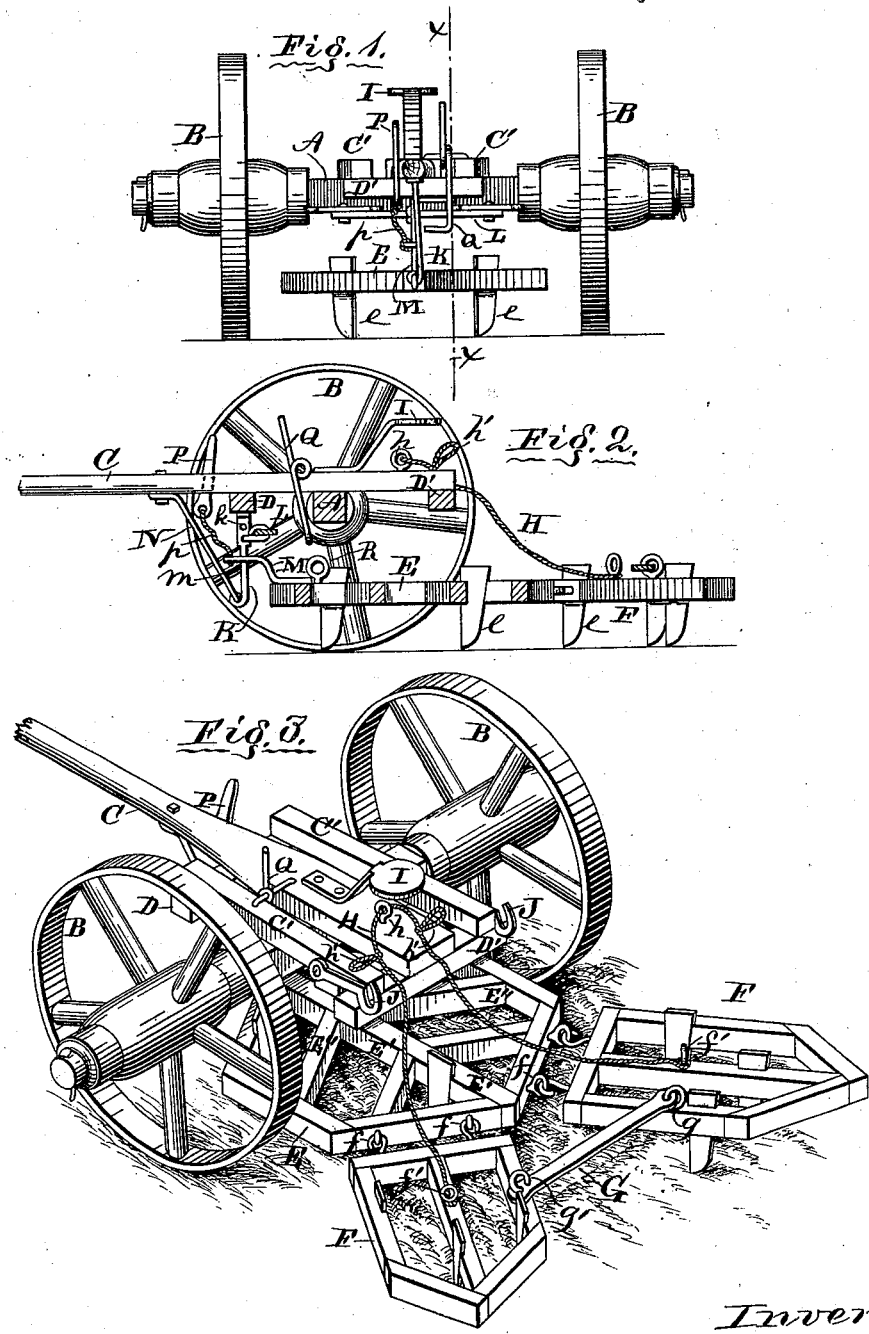
Witnesses:
M. H. Barringer.
P. R. Richards.
Inventor:
Samuel C. Dix,
By W. B. Richards,
Atty.

UNITED STATES PATENT OFFICE.

SAMUEL C. DIX, OF NEPONSET, ILLINOIS.

IMPROVEMENT IN SULKY-HARROWS.

Specification forming part of Letters Patent No. 209,028, dated October 15, 1878; application filed August 12, 1878.

*To all whom it may concern:*

Be it known that I, SAMUEL C. DIX, of Neponset, in the county of Bureau and State of Illinois, have invented certain new and useful Improvements in Sulky-Harrows; and I do hereby declare that the following is a full, clear, and exact description thereof, which will enable others skilled in the art to which it appertains to make and use the same, reference being had to the accompanying drawings, and to letters of reference marked thereon, which form a part of this specification, in which—

Figure 1 is a front elevation of a harrow embodying my invention. Fig. 2 is a sectional elevation in the plane of the line $x\ x$ in Fig. 1. Fig. 3 is a perspective view.

This invention relates to improvements in sulky-harrows; and consists in certain improvements therein, as hereinafter more fully set forth.

Referring to the drawing by letters, each letter indicating the same part in the different views—

Letter A represents the axle, supported by wheels B B. C is the draft-pole, and C' C' are bars secured to the axle adjacent to the pole C, and connected at their ends by transverse bars D D'.

E is the main harrow-section, hexagonal in form, and with a bar, E', extending from the angle at its front end to the angle at its rear end, and bars E'', parallel with the front sides, and provided with ordinary teeth $e$.

F F are smaller harrow-sections, constructed and hinged one to each rear side of the section E by hinges $f$, as shown at Fig. 3 of the drawing.

The sections F are united by a bar, G, which is secured to an eyebolt, $g$, on one section and a hook, $g'$, on the other section, so that by releasing the end of the bar G from the hook $g'$ the sections may be disconnected with each other.

H is a cord, its ends fastened, one to each section F, and its central part passed through an eyebolt, $h$, on the rear end of the draft-pole, within reach of the driver's seat I. The cord H has loops $h'$, one on each side of the eyebolt $h$, either of which loops may be taken hold of by the driver to raise the harrow F, connected therewith, to free it from obstructions or for other purposes.

Each harrow-section F has also an eyebolt, $f''$, which may be engaged with hooks J on the rear ends of the bars C' by first disengaging the bar G to suspend the harrows, as hereinafter described.

K is a pendent bar from the front crossbar, D, and has the draft-bar L adjustably attached thereto in holes $k$.

M is a bracket projecting from the front end of the harrow-section E, and has a hole, $m$, through which the bar K passes in such manner that the harrow E may be raised and lowered on the bar K. N is a brace to the pendent bar K.

P is a lever, fulcrumed at its central part to the side of the draft-pole, and a cord, $p$, connects its lower end with the bracket M, in such manner that by drawing the lever P backward the front end of the harrow E may be raised to clean it of obstructions.

To raise the harrows clear of the ground for local transportation, the sections F are turned up and engaged with the hooks J, as herein described, and the front raised by means of lever P until a pendent hook-rod, Q, may be engaged with an eye, R, on the front end of section E, when the machine may be driven from place to place with the harrows supported above the surface of the ground.

What I claim as new, and desire to secure by Letters Patent, is—

1. A wheel-harrow constructed as described, with a main section, E, of hexagonal form, hinged to the truck-frame, and two diverging sections, F F, hinged to the rear sides of the section E and connected with each other by a bar, G, pivoted to the sections F F, substantially as described, and for the purpose set forth.

2. The harrow E, hinged to the wheel-frame, and diverging harrows F F, hinged to the harrow E, in combination with the cord H, connected with the truck-frame and the harrows F F, and provided with hand-holds $h'$, substantially as described, and for the purpose set forth.

3. The harrow-sections E F F, hinged to each other, in combination with the truck-frame, hooks J and eyes $j''$, and hook-rod Q and eye R, substantially as described, and for the purpose specified.

In testimony that I claim the foregoing as my own I affix my signature in presence of two witnesses.

SAMUEL C. DIX.

Witnesses:
P. R. RICHARDS,
H. A. ALLEN.